(12) United States Patent
Tada et al.

(10) Patent No.: US 7,057,804 B2
(45) Date of Patent: Jun. 6, 2006

(54) ULTRAVIOLET IMAGING SYSTEM

(75) Inventors: Eijiroh Tada, Saitama (JP); Takayuki Ito, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/937,376

(22) Filed: Sep. 10, 2004

(65) Prior Publication Data

US 2005/0057795 A1   Mar. 17, 2005

(30) Foreign Application Priority Data

Sep. 12, 2003   (JP) ............................ 2003-321203

(51) Int. Cl.
 *G02B 13/14*   (2006.01)
 *G02B 9/64*   (2006.01)

(52) U.S. Cl. .................... 359/357; 359/356; 359/755

(58) Field of Classification Search ........ 359/350–361, 359/656–661, 754–755
See application file for complete search history.

(56) References Cited

U.S. PATENT DOCUMENTS

| | | | |
|---|---|---|---|
| 5,754,345 A * | 5/1998 | Yamamoto ................... | 359/661 |
| 5,886,826 A * | 3/1999 | Amemiya ..................... | 359/656 |
| 5,930,032 A | 7/1999 | Maruyama et al. ......... | 359/355 |
| 6,392,814 B1 * | 5/2002 | Ono ............................. | 359/661 |

FOREIGN PATENT DOCUMENTS

| | | |
|---|---|---|
| JP | 8-179201 | 7/1996 |
| JP | 10-104510 | 4/1998 |
| JP | 2858639 | 12/1998 |
| JP | 3042766 | 3/2000 |

* cited by examiner

*Primary Examiner*—Thong Q Nguyen
(74) *Attorney, Agent, or Firm*—Greenblum & Bernstein, P.L.C.

(57) ABSTRACT

An ultraviolet imaging system includes at least two negative lens elements, and at least two positive lens elements. The ultraviolet imaging system satisfies the following conditions:

$$-3 < f_{(i=330)}/r1 < -0.5 \quad (1)$$

$$65 < \nu \text{ (ALL)} \quad (2)$$

$$0 < \nu_{(i=330)}(P) - \nu_{(i=330)}(N) < 10 \quad (3)$$

wherein $f_{(i=330)}$ designates the focal length of the entire ultraviolet imaging system with respect to a wavelength "i" of 330 nm (base wavelength);

r1 designates the radius of curvature of the object-side surface of the most object-side lens element;

ν (ALL) designates a reciprocal of a dispersion value, with respect to the d-line, of the glass material of all of the lens elements;

$\nu_{(i=330)}$ (P) designates the reciprocal of the dispersion value, for the positive lens elements, with respect to the wavelength of 330 nm; and $\nu_{(i=330)}$ (N) designates the reciprocal of the dispersion value, for the negative lens elements, with respect to the wavelength of 330 nm.

7 Claims, 3 Drawing Sheets

FE= 2.3

—— 330 nm
······· 300 nm
--- 365 nm
-·-· 280 nm

-0.1  0.1
SPHERICAL
ABERRATION

CHROMATIC
ABERRATION

Y=4.0

— S
-- M

-0.1  0.1
ASTIGMATISM

Y=4.0

-0.1(%) 0.1
DISTORTION

Fig. 3
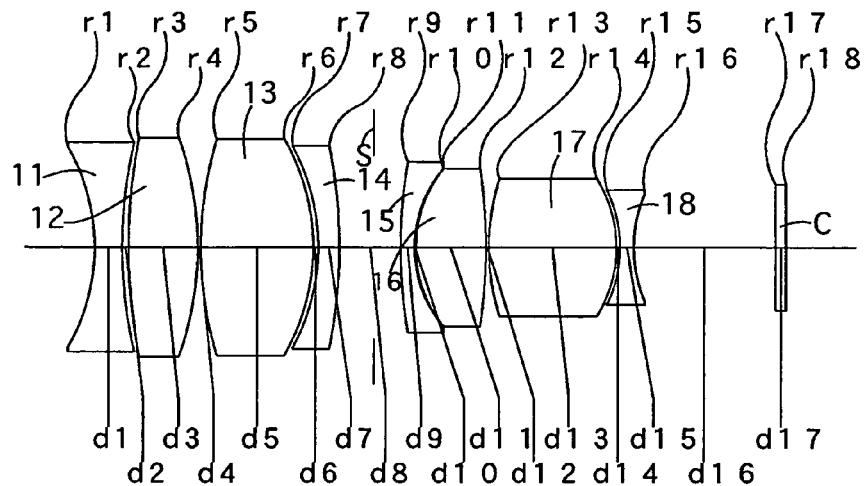
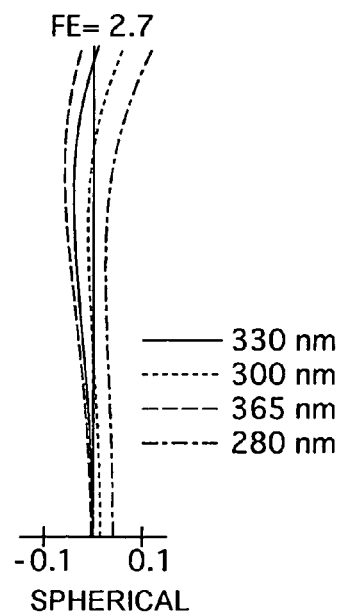
Fig. 4A
FE= 2.7
—— 330 nm
------ 300 nm
– – – 365 nm
–·–·– 280 nm
-0.1  0.1
SPHERICAL
ABERRATION
CHROMATIC
ABERRATION
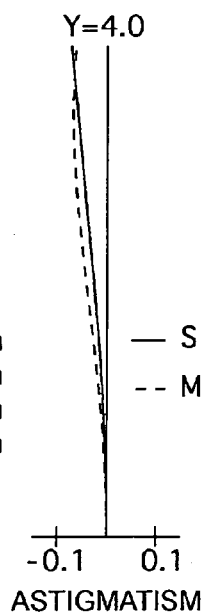
Fig. 4B
Y=4.0
—— S
– – M
-0.1  0.1
ASTIGMATISM
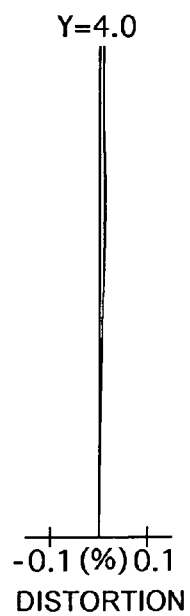
Fig. 4C
Y=4.0
-0.1 (%) 0.1
DISTORTION

FE= 2.5

— 330 nm
······ 300 nm
— — 365 nm
—·— 280 nm

-0.1  0.1
SPHERICAL
ABERRATION

CHROMATIC
ABERRATION

Y=4.0

— S
-- M

-0.1  0.1
ASTIGMATISM

Y=4.0

-0.1(%) 0.1
DISTORTION

ULTRAVIOLET IMAGING SYSTEM

BACKGROUND OF THE INVENTION

1. Field of the Invention

The present invention relates to an ultraviolet imaging system for use in an ultraviolet imaging apparatus, etc., and in particular, relates to an ultraviolet imaging system (photographing system) in which distortion is adequately corrected.

2. Description of the Prior Art

As an example of a conventional ultraviolet imaging system, a wide-angle lens system disclosed in Japanese Patent No.2858639 and Japanese Patent No.3042766 have been known; and a converging lens system disclosed in Japanese Unexamined Patent Publication No.Hei-10-104510 has been known. Note that a converging lens system generally has a narrower angle-of-view, and is used in a narrow-wavelength-band.

The above-mentioned wide-angle lens system can attain a desirable imaging quality in a typical photographing operation; however, the correcting of distortion is not sufficiently made therein. Accordingly, a wide-angle lens system is not appropriate for photography in which a distorted image should be eliminated.

The above-mentioned converging lens system generally has an angle-of-view of about 2 degrees, i.e., the photographing field is too narrow. Accordingly, a converging lens system is not suitable for an imaging system (photographing system) to be mainly used to photograph an object at a closer distance.

SUMMARY OF THE INVENTION

The present invention provides an ultraviolet imaging system in which (i) distortion is adequately corrected, (ii) chromatic aberration is adequately corrected in an ultraviolet region of 280 nm through 365 nm, and (iii) an angle-of-view of about 18 degrees is secured.

Furthermore, an ultraviolet imaging system of the present invention also achieves a longer back focal distance.

According to an aspect of the present invention, there is provided an ultraviolet imaging system including at least two lens elements having negative refractive power (hereinafter, negative lens elements), and at least two lens elements having positive refractive power (hereinafter, positive lens elements). The ultraviolet imaging system satisfies the following conditions:

$$-3 < f_{(i=330)}/r1 < -0.5 \quad (1)$$

$$65 < \nu \text{ (ALL)} \quad (2)$$

$$0 < \nu_{(i=330)}(P) - \nu_{(i=330)}(N) < 10 \quad (3)$$

wherein $f_{(i=330)}$ designates the focal length of the entire ultraviolet imaging system with respect to a wavelength "i" of 330 nm (base wavelength);

r1 designates the radius of curvature of the object-side surface of the most object-side lens element;

$\nu$ (ALL) designates a reciprocal of a dispersion value, with respect to the d-line, of the glass material of all of the lens elements;

$\nu_{(i=330)}$ (P) designates the reciprocal of the dispersion value, for the positive lens elements, with respect to the wavelength of 330 nm; and $\nu_{(i=330)}$ (N) designates the reciprocal of the dispersion value, for the negative lens elements, with respect to the wavelength of 330 nm.

Note that the above reciprocal of a dispersion value of a glass material with respect to the d-line is generally described as the Abbe number (hereinafter, simply referred to as the Abbe number) which is defined as follows:

$$\nu = (n_d - 1)/(n_F - n_C);$$

$n_d$ designates the refractive index of the d-line;
$n_F$ designates the refractive index of the F-line;
$n_C$ designates the refractive index of the C-line;

Note that the above reciprocal of the dispersion value $\nu_{(i)}$ with respect to a wavelength in the ultraviolet region (i=330 nm) is defined as "$\nu_{(i)} = (n_{(i)} - 1)/(n_{250} - n_{365})$", i.e., the ratio of a refractive index of a wavelength "i" minus one ($n_{(i)} - 1$) to the difference of refractive indexes in the predetermined ultraviolet wavelength region of 250 nm to 365 nm ($n_{250} - n_{365}$); and that the reciprocal of the dispersion value $\nu_{(i=330)}$ is respectively obtained for the positive lens elements and the negative lens elements, as $\nu_{(i=330)}(P)$ and $\nu_{(i=330)}(N)$.

A lens arrangement of the ultraviolet imaging system includes a negative first lens element, a positive second lens element, a positive third lens element, a negative fourth lens element, a negative fifth lens element, a positive sixth lens element, a positive seventh lens element, and a negative eighth lens element, in this order from the object.

The ultraviolet imaging system preferably satisfies the following conditions:

$$-0.5 < f_{(i=330)}/f_{1-2} < 0.1 \quad (4)$$

$$0.2 < f_{(i=330)}/f_{3-4} < 0.8 \quad (5)$$

$$0.2 < f_{(i=330)}/f_{5-6} < 0.8 \quad (6)$$

$$-0.5 < f_{(i=330)}/f_{7-8} < 0.1 \quad (7)$$

wherein $f_{j-p}$ designates the combined focal length of the $j^{th}$ lens element and the $p^{th}$ lens element with respect to the wavelength of 330 nm.

The ultraviolet imaging system preferably satisfies the following conditions:

$$0.1 < 1/\nu_{1-2(i=330)} < 1.0 \quad (8)$$

$$|1/\nu_{3-4(i=330)}| < 0.1 \quad (9)$$

$$|1/\nu_{5-6(i=330)}| < 0.1 \quad (10)$$

$$0.1 < 1/\nu_{7-8(i=330)} < 1.0 \quad (11)$$

Note that conditions (8) to (11) are defined as the combined dispersion ratio as follows:

$$1/\nu_{j-p} = \Sigma f_{j-p}/f_{k(i=330)} \nu_{k(i=330)} \; (k=j, p)$$

wherein $f_{k(i=330)}$ designates the focal length of the $k^{th}$ lens element with respect to the wavelength of 330 nm; and $\nu_{k(i=330)}$ designates the reciprocal of the dispersion value of the $k^{th}$ lens element with respect to the wavelength of 330 nm (i.e., in the ultraviolet region).

Regardless of the lens arrangement of the ultraviolet imaging system, the most object-side lens element thereof is preferably constituted by a negative lens element, and the negative lens element satisfies the following condition:

$$65 < \nu_1 < 80 \quad (12)$$

wherein $v_1$ designates the Abbe number of the negative lens element: $v_1=(n_{1d}-1)/(n_{1F}-n_{1C})$;

$n_{1d}$ designates the refractive index of the d-line;
$n_{1F}$ designates the refractive index of the F-line; and
$n_{1C}$ designates the refractive index of the C-line.

According to another aspect of the present invention, in an ultraviolet imaging system, all the lens elements are made of one of quartz and fluorite; and the ultraviolet imaging system includes a negative first lens element, a positive second lens element, a positive third lens element, a negative fourth lens element, a negative fifth lens element, a positive sixth lens element, a positive seventh lens element, and a negative eighth lens element, in this order from the object. The ultraviolet imaging system also satisfies the above-explained conditions (4) to (7):

$$-0.5 < f_{(i=330)}/f_{1-2} < 0.1 \quad (4)$$

$$0.2 < f_{(i=330)}/f_{3-4} < 0.8 \quad (5)$$

$$0.2 < f_{(i=330)}/f_{5-6} < 0.8 \quad (6)$$

$$-0.5 < f_{(i=330)}/f_{7-8} < 0.1 \quad (7)$$

wherein $f_{j-p}$ designates the combined focal length of the $j^{th}$ lens element and the $p^{th}$ lens element with respect to the wavelength of 330 nm.

Furthermore, the ultraviolet imaging system satisfies the above-explained conditions (8) to (11):

$$0.1 < 1/v_{1-2(i=330)} < 1.0 \quad (8)$$

$$|1/v_{3-4(i=330)}| < 0.1 \quad (9)$$

$$|1/v_{5-6(i=330)}| < 0.1 \quad (10)$$

$$0.1 < 1/v_{7-8(i=330)} < 1.0 \quad (11)$$

Note that conditions (8) to (11) are defined as the combined dispersion ratio as follows:

$$1/v_{j-p} = \Sigma f_{j-p}/f_{k(i=330)}v_{k(i=330)} \quad (k=j, p)$$

wherein $f_{k(i=330)}$ designates the focal length of the $k^{th}$ lens element with respect to the wavelength of 330 nm; and $v_{k(i=330)}$ designates the reciprocal of the dispersion value of the $k^{th}$ lens element with respect to the wavelength of 330 nm.

Still further, the negative first lens element of the ultraviolet imaging system preferably satisfies the above-explained condition (12):

$$65 < v_1 < 80 \quad (12)$$

wherein $v_1$ designates the Abbe number of the negative first lens element: $v_1=(n_{1d}-1)/(n_{1F}-n_{1C})$;

$n_{1d}$ designates the refractive index of the negative lens element with respect to the d-line;

$n_{1F}$ designates the refractive index of the negative lens element with respect to the F-line; and $n_{1C}$ designates the refractive index of the negative lens element with respect to the C-line.

The present disclosure relates to subject matter contained in Japanese Patent Application No. 2003-321203 (filed on Sep. 12, 2003) which is expressly incorporated herein in its entirety.

BRIEF DESCRIPTION OF THE DRAWINGS

The present invention will be discussed below in detail with reference to the accompanying drawings, in which:

FIG. 3 is a lens arrangement of the ultraviolet imaging system, according to a second embodiment of the present invention;

FIGS. 4A, 4B and 4C show aberrations occurred in the lens arrangement shown in FIG. 3 at the short focal length extremity;

DESCRIPTION OF THE PREFERRED EMBODIMENTS

Figure 1:
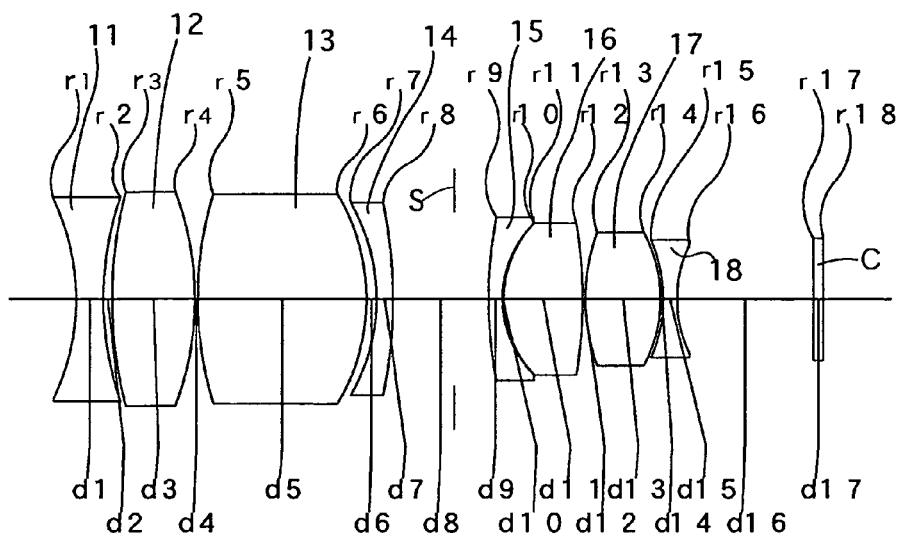
FIG. 1 is a lens arrangement of the ultraviolet imaging system, according to a first embodiment of the present invention.
Figure 5:
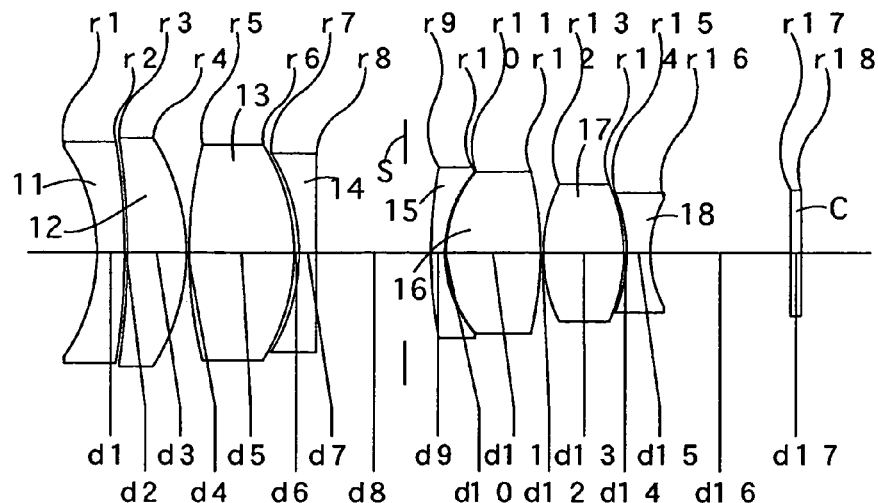
FIG. 5 is a lens arrangement of the ultraviolet imaging system, according to a third embodiment of the present invention.

As shown in FIGS. 1, 3 and 5, an ultraviolet imaging system of the present invention includes a negative first lens element 11, a positive second lens element 12, a positive third lens element 13, a negative fourth lens element 14, a diaphragm S, a negative fifth lens element 15, a positive sixth lens element 16, a positive seventh lens element 17, and a negative eighth lens element 18, in this order from the object. A cover glass (filter group) C is provided behind the negative eighth lens element 18 and in front of an imaging device (CCD).

Focusing is performed by advancing the entire ultraviolet imaging system.

The cover glass and all the lens elements are made of one of quartz and fluorite.

Condition (1) specifies a predetermined amount of concavity on the object-side surface (surface No. 1) of the most object-side lens element (i.e., the negative first lens element 11) for the purpose of suitably correcting distortion when an object at a closer distance is photographed.

Furthermore, in the case where the ultraviolet imaging system is used as an exchangeable lens system, it is desirable to secure a longer back focal distance. For attaining this purpose as well, the object-side surface of the negative first lens element 11 is preferably formed as a concave surface.

If $f_{(i=330)}/r1$ exceeds the upper limit of condition (1), the radius of curvature of the concave surface of the object side surface (surface No. 1) of the negative first lens element 11 becomes larger (i.e., closer to a flat surface), or becomes a convex surface. Consequently, the correcting of distortion becomes difficult. Moreover, the back focal distance becomes shorter, so that it is difficult to utilize the ultraviolet imaging system as an exchangeable lens system.

If $f_{(i=330)}/r1$ exceeds the lower limit of condition (1), the curvature of the concave surface of the object side surface (surface No. 1) of the negative first lens element 11 becomes too large. As a result, spherical aberration and distortion are overcorrected.

Condition (2) specifies that a glass material whose transmittance with respect to ultraviolet ray is higher is used for all the lens elements of the ultraviolet imaging system. In practice, glass materials which can satisfy condition (2) are quartz and fluorite.

In the case of a glass material which exceeds the lower limit of condition (2), the transmittance thereof with respect to ultraviolet ray is lower, and such a glass material is not appropriate for an ultraviolet imaging system.

Condition (3) is provided for suitably correcting chromatic aberration in the ultraviolet wavelength region of 250 nm to 365 nm.

In condition (3), the reciprocal of the dispersion value $v_{(i=330)}$ is defined as follows:

$$v_{(i=330)}=(n_{(i=330)}-1)/(n_{250}-n_{365})$$

Namely, the ratio of a refractive index of a wave length "i" minus one ($n_{(i)}-1$) to the difference of refractive indexes in the predetermined ultraviolet wavelength region of 250 nm to 365 nm ($n_{250}-n_{365}$) is obtained; and the reciprocal of the dispersion value $v_{(i=330)}$ is respectively obtained for the positive lens elements and the negative lens elements, as $v_{(i=330)}(P)$ and $v_{(i=330)}(N)$.

If ($v_{(i=330)}(P)-v_{(i=330)}(N)$) exceeds the upper limit of condition (3), chromatic aberration in the ultraviolet wavelength region of 250 nm to 365 nm is overcorrected.

If ($v_{(i=330)}(P)-v_{(i=330)}(N)$) exceeds the lower limit of condition (3), chromatic aberration in the ultraviolet wavelength region of 250 nm to 365 nm is undercorrected.

Conditions (4) through (7) are provided under the condition that two lens elements (e.g., 11 and 12) out of the first to eighth lens elements of the ultraviolet imaging system are defined as a pair to which a combined focal length is respectively defined.

If $f_{(i=330)}/f_{1-2}$ exceeds the upper limit of condition (4), it becomes difficult to secure a longer back focal distance.

If $f_{(i=330)}/f_{1-2}$ exceeds the lower limit of condition (4), it would be advantageous to secure a longer back focal distance; however, higher order aberrations tend to occur.

If $f_{(i=330)}/f_{3-4}$ exceeds the upper limit of condition (5), higher order aberrations tend to occur.

If $f_{(i=330)}/f_{3-4}$ exceeds the lower limit of condition (5), the overall length of the ultraviolet imaging system becomes longer.

If $<f_{(i=330)}/f_{5-6}$ exceeds the upper limit of condition (6), higher order aberrations tend to occur, as in the case of condition (5).

If $<f_{(i=330)}/f_{5-6}$ exceeds the lower limit of condition (6), the overall length of the ultraviolet imaging system becomes longer, and spherical aberration is undercorrected.

If $f_{(i=330)}/f_{7-8}$ exceeds the upper limit of condition (7), distortion is undercorrected, so that the so-called barrel distortion remains.

If $f_{(i=330)}/f_{7-8}$ exceeds the lower limit of condition (7), distortion is overcorrected, so that the so-called pincushion distortion remains. Furthermore, higher order aberrations tend to occur.

Similar to conditions (4) to (7), conditions (8) through (11) are provided under the condition that two lens elements (e.g., 11 and 12) out of the first to eighth lens elements of the ultraviolet imaging system are defined as a pair to which a combined focal length is respectively defined.

In conditions (8) to (11), the value of $1/v_{j-p}$ is the combined dispersion ratio of the $j^{th}$ lens element and the $p^{th}$ lens element.

Note that the combined dispersion ratio is defined as follows:

$$1/v_{j-p}=\Sigma f_{j-p}/f_{k(i=330)}v_{k(i=330)} (k=j, p)$$

wherein $f_{k(i=330)}$ designates the focal length of the $k^{th}$ lens element with respect to the wavelength of 330 nm; and $v_{k(i=330)}$ designates the reciprocal of the dispersion value of the $k^{th}$ lens element with respect to the wavelength of 330 nm.

If $1/v_{1-2(i=330)}$ exceeds the upper limit of condition (8), chromatic aberration is undercorrected.

If $1/v_{1-2(i=330)}$ exceeds the lower limit of condition (8), chromatic aberration is overcorrected.

If $1/v_{7-8(i=330)}$ exceeds the upper limit of condition (11), chromatic aberration is undercorrected.

If $1/v_{7-8(i=330)}$ exceeds the lower limit of condition (11), chromatic aberration is overcorrected.

If $|1/v_{3-4(i=330)}|$ exceeds the upper limit of condition (9), chromatic aberration is undercorrected.

If $|1/v_{5-6(i=330)}|$ exceeds the upper limit of condition (10), chromatic aberration is undercorrected.

Condition (12) specifies the Abbe number of a negative lens element in the case where the negative lens element is provided as the most object-side lens element of the ultraviolet imaging system.

If $v_1$ exceeds the upper limit of condition (12), the effect of the correcting of chromatic aberration becomes smaller, and a glass material which is susceptible to being scratched has to be selected. Accordingly, a lens element made of such a glass material is not appropriate for the most object-side lens element (the negative first lens element), since the most object-side surface thereof is exposed from a lens barrel or a camera body.

If $v_1$ exceeds the lower limit of condition (12), the transmittance of the glass material with respect to ultraviolet ray is insufficient, and a lens element made of such a glass material is not appropriate for an ultraviolet imaging system.

Specific numerical data of the embodiments will be described hereinafter.

In the diagrams of chromatic aberration represented by spherical aberration, the solid line and the three types of dotted lines respectively indicate spherical aberrations with respect to the wavelengths of 330 nm, 300 nm, 365 nm and 280 nm.

In the diagrams of astigmatism, S designates the sagittal image, and M designates the meridional image.

In the tables, FE designates the effective f-number, f designates the focal length of the entire ultraviolet imaging system, Y designates the maximum image height, M designates the lateral magnification, fB designates the back focal distance (the equivalent air thickness along the optical axis from the most image-side surface of the cover glass CG to the image plane of the imaging device (CCD)), r designates the radius of curvature, d designates the lens-element thickness or distance between lens elements, and a glass material indicating either quartz (refractive index: $n_{330}$=1.48059, $n_{250}$=1.50745, $n_{365}$=1.47454) or fluorite (refractive index: $n_{330}$=1.44909, $n_{250}$=1.46730, $n_{365}$=1.44491).

Embodiment 1

Figure 2A:
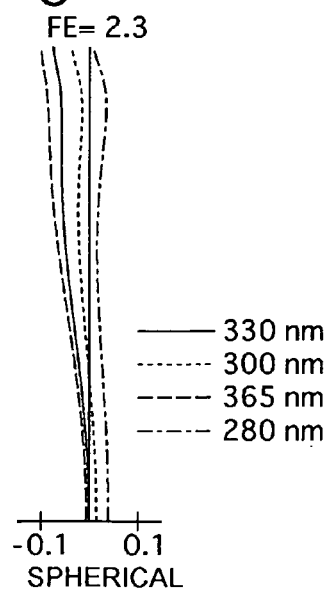
FIGS. 2A, 2B and 2C show aberrations occurred in the lens arrangement shown in FIG. 1 at the short focal length extremity.
Figure 2B:
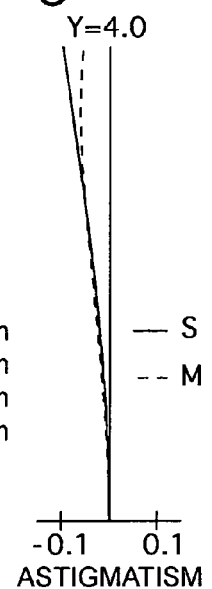
Figure 2C:
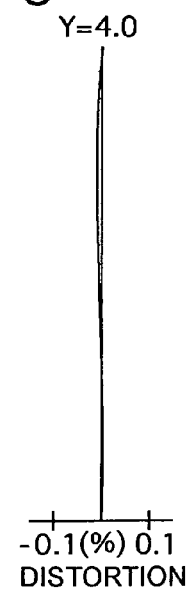

FIG. 1 is the lens arrangement of the ultraviolet imaging system, according to the first embodiment of the present invention. FIGS. 2A, 2B and 2C show aberrations occurred in the lens arrangement shown in FIG. 1 at the short focal length extremity. Table 1 shows the numerical data of the first embodiment.

A diaphragm S is provided 4.51 on the image side of the lens surface No. 8. The image plane is provided 3.95 behind lens surface No. 18. The base wavelength is 330 nm.

TABLE 1

FE = 1:2.3
f = 24.96
M = −0.100
Y = 4.0
$f_B = 14.46 (=10.00 + 0.75/1.48059 + 3.95)$

| Surface No. | r | d | Glass Material |
|---|---|---|---|
| 1 | −17.078 | 2.00 | quartz |
| 2 | 23.411 | 0.63 | |
| 3 | 31.713 | 6.00 | fluorite |
| 4 | −22.708 | 0.20 | |
| 5 | 26.679 | 12.37 | fluorite |
| 6 | −15.092 | 0.75 | |
| 7 | −14.093 | 1.20 | quartz |
| 8 | −35.309 | 7.00 | |
| 9 | 31.661 | 1.00 | quartz |
| 10 | 7.800 | 0.10 | |
| 11 | 8.056 | 5.80 | fluorite |
| 12 | −33.897 | 0.20 | |
| 13 | 14.441 | 5.54 | fluorite |
| 14 | −10.329 | 0.20 | |
| 15 | −10.783 | 1.00 | quartz |
| 16 | 9.038 | 10.00 | |
| 17 | ∞ | 0.75 | quartz (plane-parallel plate) |
| 18 | ∞ | — | |

Embodiment 2

FIG. 3 is the lens arrangement of the ultraviolet imaging system, according to the second embodiment of the present invention. FIGS. 4A, 4B and 4C show aberrations occurred in the lens arrangement shown in FIG. 3 at the short focal length extremity. Table 2 shows the numerical data of the second embodiment.

A diaphragm S is provided 2.43 on the image side of the lens surface No. 8. The imaging plane is provided 4.07 behind lens surface No. 18. The base wavelength is 330 nm.

TABLE 2

FE = 1:2.7
f = 24.90
M = −0.100
Y = 4.0
$f_B = 14.58 (=10.00 + 0.75/1.48059 + 4.07)$

| Surface No. | r | d | Glass Material |
|---|---|---|---|
| 1 | −14.139 | 1.98 | quartz |
| 2 | 32.429 | 0.45 | |
| 3 | 40.347 | 4.94 | fluorite |
| 4 | −22.903 | 0.20 | |
| 5 | 27.029 | 7.92 | fluorite |
| 6 | −15.467 | 0.35 | |
| 7 | −15.068 | 1.50 | quartz |
| 8 | −36.307 | 4.34 | |
| 9 | 35.851 | 1.00 | quartz |
| 10 | 8.706 | 0.10 | |
| 11 | 9.101 | 4.94 | fluorite |
| 12 | −37.510 | 0.20 | |
| 13 | 16.408 | 9.14 | fluorite |
| 14 | −9.300 | 0.24 | |
| 15 | −9.446 | 1.00 | quartz |
| 16 | 9.880 | 10.00 | |
| 17 | ∞ | 0.75 | quartz (plane-parallel plate) |
| 18 | ∞ | — | |

Embodiment 3

Figure 6A:
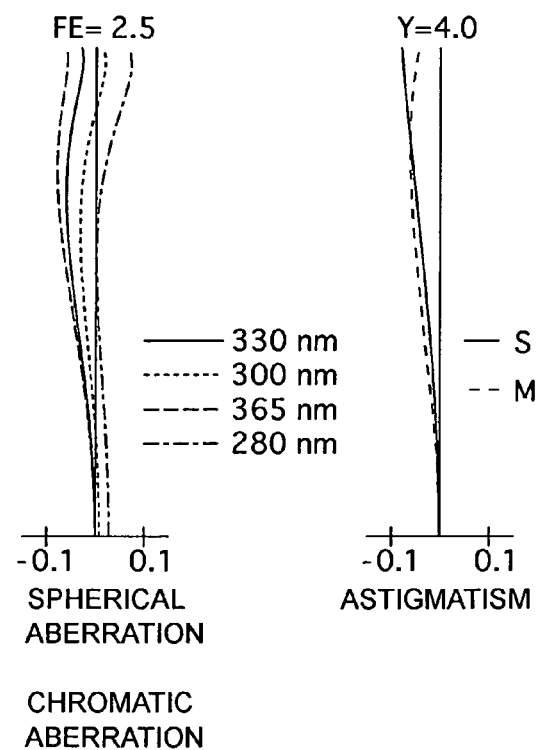
FIGS. 6A, 6B and 6C show aberrations occurred in the lens arrangement shown in FIG. 5 at the short focal length extremity.
Figure 6B:
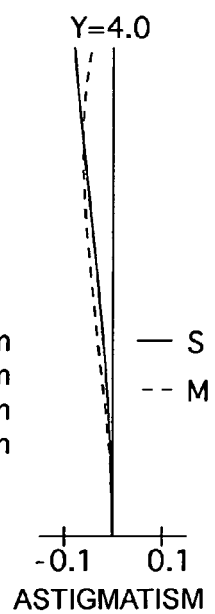
Figure 6C:
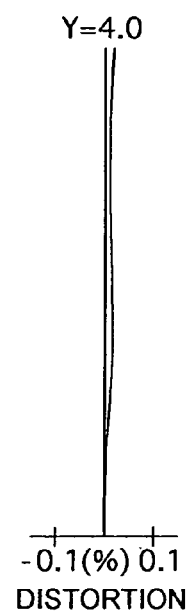

FIG. 5 is the lens arrangement of the ultraviolet imaging system, according to the third embodiment of the present invention. FIGS. 6A, 6B and 6C show aberrations occurred in the lens arrangement shown in FIG. 5 at the short focal length extremity. Table 3 shows the numerical data of the third embodiment.

A diaphragm S is provided 6.27 on the image side of the lens surface No. 8. The imaging plane is provided 3.95 behind lens surface No. 18. The base wavelength is 330 nm.

TABLE 3

FE = 1:2.5
f = 24.95
M = −0.100
Y = 4.0
$f_B = 14.46 (=10.00 + 0.75/1.48059 + 3.95)$

| Surface No. | r | d | Lens Material |
|---|---|---|---|
| 1 | −12.941 | 2.00 | quartz |
| 2 | −50.000 | 0.20 | |
| 3 | −54.156 | 4.20 | fluorite |
| 4 | −15.288 | 0.20 | |
| 5 | 31.108 | 7.44 | fluorite |
| 6 | −14.609 | 0.36 | |
| 7 | −13.763 | 1.20 | quartz |
| 8 | 1059.491 | 8.13 | |
| 9 | 33.193 | 1.00 | quartz |
| 10 | 8.712 | 0.10 | |
| 11 | 8.895 | 6.76 | fluorite |
| 12 | −25.012 | 0.20 | |
| 13 | 11.133 | 5.75 | fluorite |
| 14 | −11.918 | 0.20 | |
| 15 | −11.529 | 1.68 | quartz |
| 16 | 8.037 | 10.00 | |
| 17 | ∞ | 0.75 | quartz (plane-parallel plate) |
| 18 | ∞ | — | |

Table 4 shows the numerical values of each condition in each embodiment.

TABLE 4

| | Embod. 1 | Emod. 2 | Embod. 3 |
|---|---|---|---|
| Condition (1) | −1.92 | −1.76 | −1.93 |
| Condition (2) | Negative Lens Element: 68.2 | | |
| | Positive Lens Element: 95.2 | | |
| Condition (3) | 5.4 | 5.4 | 5.4 |
| Condition (4) | −0.25 | −0.35 | −0.43 |
| Condition (5) | 0.63 | 0.65 | 0.27 |
| Condition (6) | 0.56 | 0.48 | 0.68 |
| Condition (7) | −0.36 | −0.31 | −0.23 |
| Condition (8) | 0.169 | 0.13 | 0.44 |
| Condition (9) | 0.029 | 0.034 | −0.027 |
| Condition (10) | 0.007 | 0.007 | 0.017 |
| Condition (11) | 0.235 | 0.285 | 0.385 |
| Condition (12) | 68.2 | 68.2 | 68.2 |

As can be understood from Table 4, the first through third embodiments satisfy conditions (1) through (12). Furthermore, as can be understood from the aberration diagrams, distortion and chromatic aberration in the ultraviolet region of 280 nm to 365 nm is well corrected.

According to the above description, an ultraviolet imaging system with the following features can be obtained:
 (i) distortion is adequately corrected;
 (ii) chromatic aberration is adequately corrected in an ultraviolet region of 280 nm through 365 nm; and
 (iii) an angle-of-view of about 18 degrees is secured.

What is claimed is:

1. An ultraviolet imaging system comprises at least two negative lens elements, and at least two positive lens elements, wherein said ultraviolet imaging system satisfies the following conditions:

$$-3 < f_{(i=330)}/r1 < -0.5$$

$$65 < \nu \text{ (ALL)}$$

$$0 < \nu_{(i=330)}(P) - \nu_{(i=330)}(N) < 10$$

wherein $f_{(i=330)}$ designates the focal length of the entire ultraviolet imaging system with respect to a wavelength "i" of 330 nm;

r1 designates the radius of curvature of the object-side surface of the most object-side lens element;

$\nu$ (ALL) designates the Abbe number of the glass material of all of said lens elements;

$\nu_{(i=330)}$ (P) designates the reciprocal of the dispersion value, for said positive lens elements, with respect to the wavelength of 330 nm; and $\nu_{(i=330)}$ (N) designates the reciprocal of the dispersion value, for the negative lens elements, with respect to the wavelength of 330 nm.

2. The ultraviolet imaging system according to claim 1, comprising a negative first lens element, a positive second lens element, a positive third lens element, a negative fourth lens element, a negative fifth lens element, a positive sixth lens element, a positive seventh lens element, and a negative eighth lens element, in this order from an object, wherein said ultraviolet imaging system satisfies the following conditions:

$$-0.5 < f_{(i=330)}/f_{1-2} < 0.1$$

$$0.2 < f_{(i=330)}/f_{3-4} < 0.8$$

$$0.2 < f_{(i=330)}/f_{5-6} < 0.8$$

$$-0.5 < f_{(i=330)}/f_{7-8} < 0.1$$

wherein $f_{j-p}$ designates the combined focal length of the $j^{th}$ lens element and the $p^{th}$ lens element with respect to the wavelength of 330 nm.

3. The ultraviolet imaging system according to claim 2, further satisfying the following conditions:

$$0.1 < 1/\nu_{1-2(i=330)} < 1.0$$

$$|1/\nu_{3-4(i=330)}| < 0.1$$

$$|1/\nu_{5-6(i=330)}| < 0.1$$

$$0.1 < 1/\nu_{7-8(i=330)} < 1.0$$

wherein $$1/\nu_{j-p} = \Sigma f_{j-p}/f_{k(i=330)} \nu_{k(i=330)} \ (k=j, p)$$

$f_{k(i=330)}$ designates the focal length of the $k^{th}$ lens element with respect to the wavelength of 330 nm; and $\nu_{k(i=330)}$ designates the reciprocal of the dispersion value of the $k^{th}$ lens element with respect to the wave length of 330 nm.

4. The ultraviolet imaging system according to claim 1, wherein the most object-side lens element of said ultraviolet imaging system comprises a negative lens element; and wherein said negative lens element satisfies the following condition:

$$65 < \nu_1 < 80$$

wherein $\nu_1$ designates the Abbe number of said negative lens element: $\nu_1 = (n_{1d} - 1)/(n_{1F} - n_{1C})$;

$n_{1d}$ designates the refractive index of the d-line;

$n_{1F}$ designates the refractive index of the F-line; and $n_{1C}$ designates the refractive index of the C-line.

5. An ultraviolet imaging system comprises a negative first lens element, a positive second lens element, a positive third lens element, a negative fourth lens element, a negative fifth lens element, a positive sixth lens element, a positive seventh lens element, and a negative eighth lens element, in this order from an object, wherein all said lens elements are made of one of quartz and fluorite; and wherein said ultraviolet imaging system satisfies the above conditions:

$$-0.5 < f_{(i=330)}/f_{1-2} < 0.1$$

$$0.2 < f_{(i=330)}/f_{3-4} < 0.8$$

$$0.2 < f_{(i=330)}/f_{5-6} < 0.8$$

$$-0.5 < f_{(i=330)}/f_{7-8} < 0.1$$

wherein $f_{(i=330)}$ designates the focal length of the entire ultraviolet imaging system with respect to a wavelength "i" of 330 nm;

$f_{j-p}$ designates the combined focal length of the $j^{th}$ lens element and the $p^{th}$ lens element with respect to the wavelength of 330 nm.

6. The ultraviolet imaging system according to claim 5, further satisfying the following conditions:

$$0.1 < 1/\nu_{1-2(i=330)} < 1.0$$

$$|1/\nu_{3-4(i=330)}| < 0.1$$

$$|1/\nu_{5-6(i=330)}| < 0.1$$

$$0.1 < 1/\nu_{7-8(i=330)} < 1.0$$

wherein $$1/\nu_{j-p} = \Sigma f_{j-p}/f_{k(i=330)} \nu_{k(i=330)} \ (k=j, p)$$

$f_{k(i=330)}$ designates the focal length of the $k^{th}$ lens element with respect to the wavelength of 330 nm; and $\nu_{k(i=330)}$ designates the reciprocal of the dispersion value of the $k^{th}$ lens element with respect to the wave length of 330 nm.

7. The ultraviolet imaging system according to claim 5, satisfying the following condition:

$$65 < \nu_1 < 80$$

wherein $\nu_1$ designates the Abbe number of the negative first lens element: $\nu_1 = (n_{1d} - 1)/(n_{1F} - n_{1C})$;

$n_{1d}$ designates the refractive index of the d-line;

$n_{1F}$ designates the refractive index of the F-line; and $n_{1C}$ designates the refractive index of the C-line.

* * * * *